Sept. 17, 1929.   A. F. MASURY   1,728,874
FLEXIBLE CONNECTION FOR MOTOR VEHICLE PANELS
Filed Sept. 1, 1928
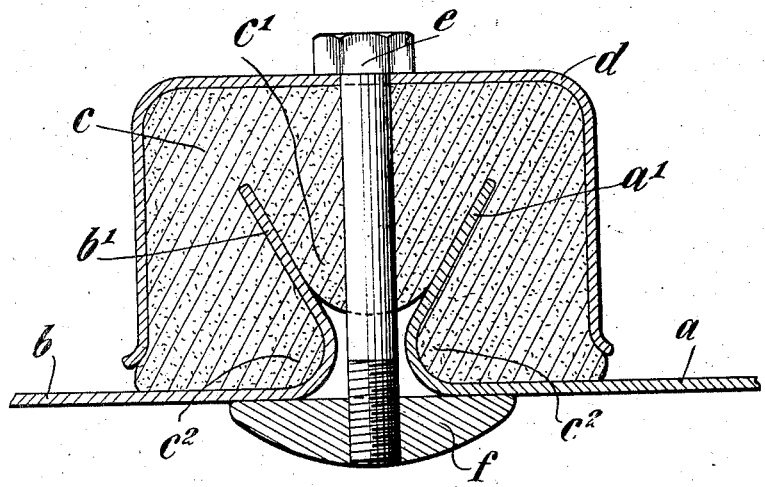
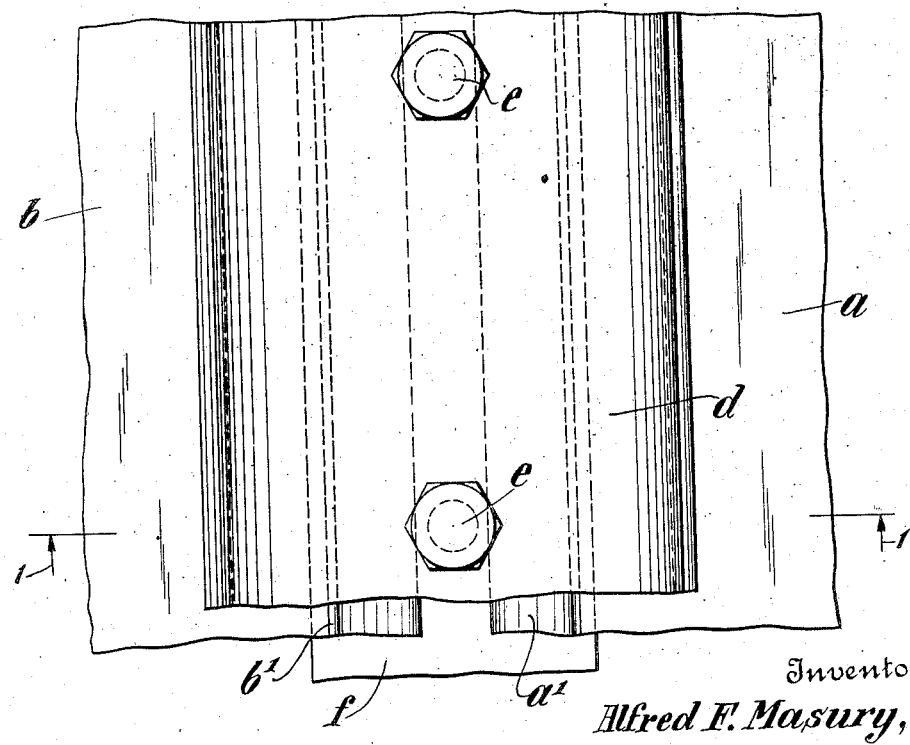
Inventor
Alfred F. Masury,
By his Attorneys
Redding, Greeley, O'Shea & Campbell Patented Sept. 17, 1929

1,728,874

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE

FLEXIBLE CONNECTION FOR MOTOR-VEHICLE PANELS

Application filed September 1, 1928. Serial No. 303,465.

This invention relates to improved connections between adjacent panels forming the body of a motor vehicle, such panels sectionalizing the body and permitting weaving thereof during operation. It is desirable that a degree of relative movement be permitted between the panels without impairing the strength of the connection therebetween, such connections affording a means for eliminating squeaks and body drumming.

Body constructions designed heretofore have permitted the desired degree of relative movement between adjacent panels but the cost of construction thereof has been prohibitive by reason of the fact that the connections have been hand fitted. Accordingly, an object of the present invention is to provide a connection possessing the desirable qualities noted above in addition to the ability of being manufactured cheaply, preferably by simple stamping operations. The connection described herein possesses this virtue in addition to the quality of securely connecting the panels although accommodating, yieldingly, a degree of movement therebetween.

The invention is more specifically characterized by turned back extensions on the adjacent edges of the panels, these extensions being received in a strip of non-metallic yielding moulding. Bolts pass between, but out of contact with the extensions and secure a cover strip and bead together to place the moulding under compression. In this manner, the panels are connected with provision for relative movement in any direction.

Further objects and advantages of the invention will be apparent as the description proceeds and reference will now be had to the accompanying drawings, wherein:

Figure 1 is a view in section taken on line 1—1 of Figure 2 and looking in the direction of the arrows, showing one form of the present invention.

Figure 2 is a plan view of the connection shown in Figure 1.

Referring to the above drawings, $a$ designates a panel suitable for forming a portion of a vehicle body and formed with a flanged extension $a'$ forming an acute angle with the panel. The adjacent panel $b$ is formed with a similar extension $b'$ and a strip of non-metallic yielding moulding $c$, such as rubber, is formed with a generally M-shaped cross section to engage the flanges formed on the adjacent panels. The moulding is provided with a central thickened portion $c'$ which lies between the flanges $a'$ and $b'$ to space them apart, and the legs of the M are formed with inwardly extending portions $c^2$ to engage the acute angles between the flanges $a'$ and $b'$ and the respective panels $a$ and $b$.

A U-shaped strip of metal $d$ encloses the moulding, and bolts $e$, extending through the thickened portion $c'$ of the moulding, engage a bead $f$ on the opposite side of the panels. It will be apparent that the compression set up in the rubber moulding $c$ may be varied by means of the bolts $e$. The panel sections are spaced apart yieldingly and relative movement therebetween is accommodated by means of the connection described above. Due to the fact that the pannels are connected through the yielding connection described, all squeaks and drumming of the body is eliminated. Although the invention has been described in connection with the specific construction shown in the accompanying drawings, it is not to be limited, save as defined in the appended claims.

I claim as my invention:

1. A connection of the character described comprising a panel, an adjacent panel to be connected thereto, flanged extensions on the panels, said extensions forming acute angles with respect to the panels, an M-shaped non-metallic yielding moulding, a portion of the moulding lying between the extensions, other portions of the moulding lying in the acute angles between the extensions and the panels, a U-shaped cover strip enclosing the moulding, securing means passing through the moulding between the extensions, means secured to the securing means for engaging the panels, whereby the elements are secured together.

2. A connection of the character described comprising a panel, an adjacent panel to be connected thereto, flanged extensions on the panels, said extensions forming acute angles with respect to the panels, non-metallic yielding moulding, a portion of the moulding lying between the extensions, other portions of the moulding lying in the acute angles between the extensions and the panels, a cover strip enclosing the moulding, a bead overlying the adjacent edges of the panels, and a bolt passing through the moulding and connecting the bead to the cover strip.

This specification signed this 27 day of August, A. D. 1928.

ALFRED F. MASURY.